May 17, 1966     J. SYLVESTER     3,251,104
CLAMPING DEVICE

Filed Feb. 26, 1964     2 Sheets-Sheet 1

INVENTOR.
JACK SYLVESTER
BY
ATTORNEYS

May 17, 1966  J. SYLVESTER  3,251,104
CLAMPING DEVICE

Filed Feb. 26, 1964  2 Sheets-Sheet 2

INVENTOR.
JACK SYLVESTER
BY
ATTORNEYS

United States Patent Office 3,251,104
Patented May 17, 1966

3,251,104
CLAMPING DEVICE
Jack Sylvester, Fox Bluff, Rte. 1, Waunakee, Wis.
Filed Feb. 26, 1964, Ser. No. 347,411
1 Claim. (Cl. 24—73)

My invention relates to an improvement in clamping devices, particularly in clamping devices for attaching a flag or similar device to the halyard on a flag pole.

It is a primary object of my invention to provide a compact, sturdy, economical clamping device that may be used to attach a flag to a halyard.

It is a further object of my invention to provide a halyard clamping device which can be quickly and easily attached to a halyard, and which may be easily removed or repositioned on the halyard.

Other objects and advantages of my invention will be readily apparent from the following detailed description taken in conjunction with the accompanying drawings, wherein a preferred embodiment of the principles of the invention has been selected for exemplification.

Figure 3:
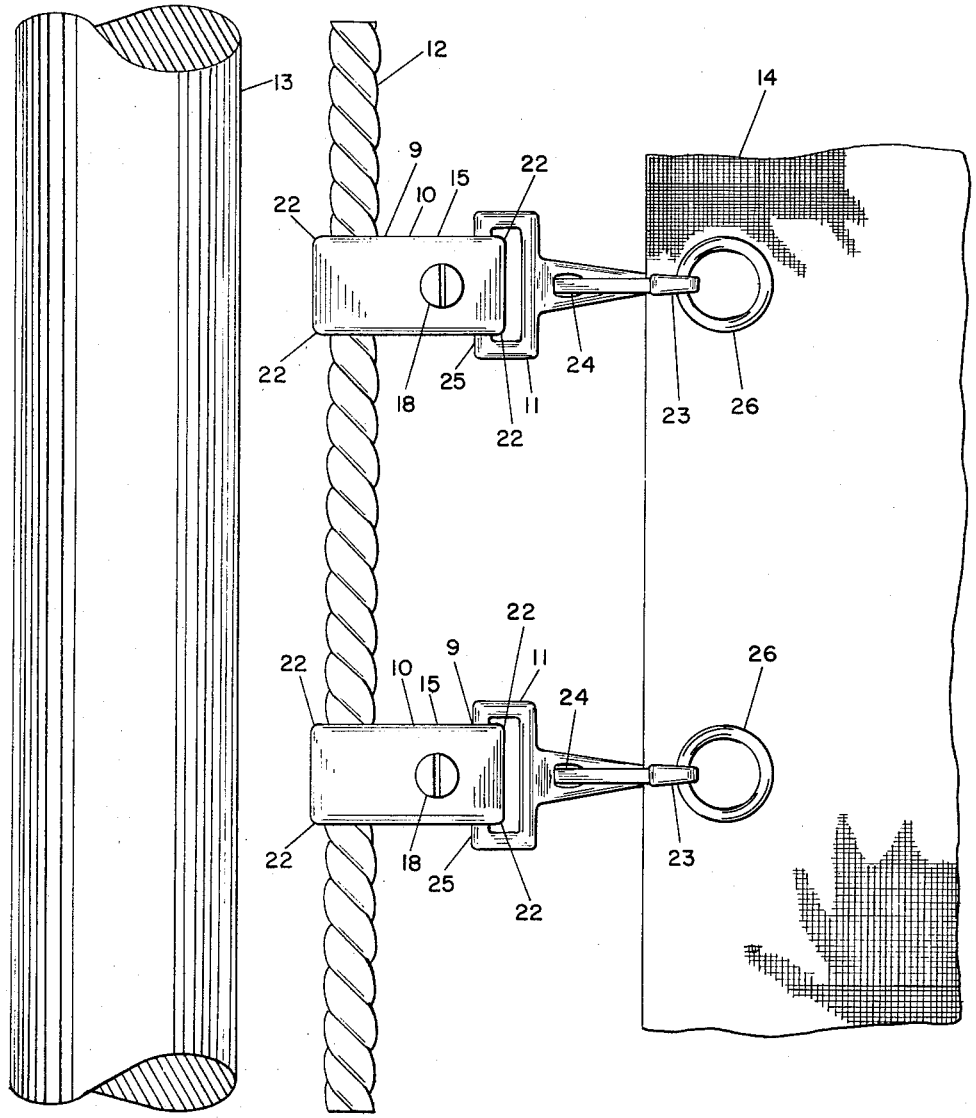
FIG. 3 is a front view of a pair of my clamping devices in use.

In general, my novel clamping device 9 includes a clamp 10 and a spring clip 11 or other clip means suitable for securing a flag. The clamp 10 is adapted to engage the spring clip 11 in preferably pivotable relation, and to tightly grip the halyard 12 of a flagpole 13 in fixed relation, as shown in FIG. 3.

Figure 1:
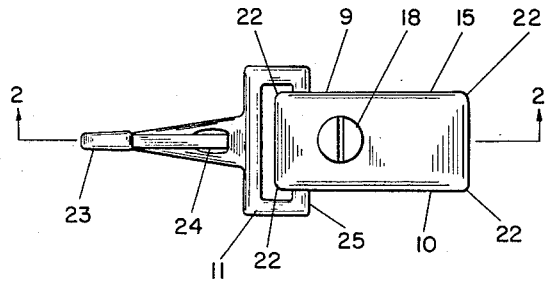
FIG. 1 is a front plan view of my novel clamping device.
Figure 2:
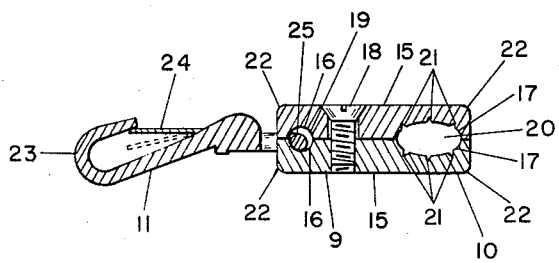
FIG. 2 is a partial section view of my clamping device taken along section line 2—2 of FIG. 1.
Figure 4:
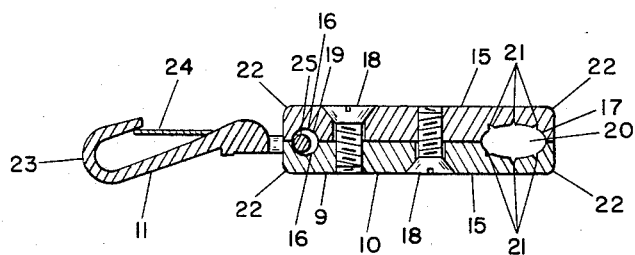
FIG. 4 is a partial section view of a modification of my device.

The clamp 10 includes a pair of mating blocks 15. The blocks 15 are fastened together in mating relation by a screw 18 or other suitable fastening means. When secured, the blocks 15 mate to define a passage 19 through the clamp 10 which is adapted to encompass the attaching bar 25 of the spring clip 11 in rotatable relation, and to define a passage 20 through the clamp 10 which is adapted to encompass a halyard in fixed relation. The screw 18 preferably extends through the blocks 15 at a point approximately midway between the passages 19 and 20. The screw 18 is preferably countersunk in one of the blocks 15, and engages the mating block in threaded relation, as shown in FIG. 2. In the modification of my invention shown in FIG. 4, a pair of screws 18 are employed, one screw 18 being countersunk in each of the blocks 15 and engaging the other block in threaded relation. Such an embodiment is particularly well suited for use in securing large flags, or where the secured flag is subjected to considerable wind whipping.

In the preferred embodiment of my invention illustrated in the drawings, each block 15 has a groove 16 of substantially semicircular cross-section near one of its ends, and a groove 17 of preferably elliptical cross-section near its other end. Both the grooves 16 and 17 run the entire width of the blocks 15. Preferably, the surface of each groove 17 is roughened by a plurality of notches 21, as shown, or by knurling or other suitable means. While in the illustrated embodiment the blocks 15 are substantially identical, they may, of course, be varied with respect to each other in both cross-section and external dimensions without departing from the principles of my invention, so long as they mate to form the required passages 19 and 20 when they are fastened together. For example, one of the blocks could have a keyway (not shown) while the other block would have a mating key (not shown) to prevent relative movement of the blocks in use. Also, the size and shape of the blocks 15 may vary, depending upon the size of the flag and the halyard with which they are to be used. The exposed corners 22 of the blocks 15 are preferably rounded. Preferred materials for the blocks 15 are aluminum or brass, but any suitably strong and weather resistant material may be used.

The illustrated spring clip 11 has a hook 23, a spring arm 24 and an attaching bar 25. As viewed in FIG. 2, the spring arm 24 may be pressed down and away from the hook 23 to the position illustrated by the dotted lines, thus allowing the hook 23 to be inserted through an opening, such as that of a grommet on a flag. When the spring arm 24 is released, it returns to the position of FIG. 2, thus preventing the removal of the hook 23 from the opening.

Assembly and use of my clamping device 9 is fast and simple. Initially, the blocks 15 are not assembled. To attach the device 9 to a halyard 12, the halyard 12 is positioned in the groove 17 of one of the blocks 15 and the attaching bar 25 of the clip 11 is positioned in the groove 16 of the same block 15. The second block 15 is then fastened to the first with the screw 18, encompassing the attaching bar 25 in the passage 19 and the halyard 12 in the passage 10. The grooves 17 should be sufficiently small so that the notches 21 grip to the halyard 12 tightly when the screw 18 has been tightened. Whether or not the blocks 15 hold the attaching bar 25 of the clip 11 fixedly or in rotatable relation is a matter of choice. The illustrated grooves 16 are of such size that the attaching bar 25 freely rotates within the passage 19. The flag 14 may be quickly attached to the halyard 12 by inserting the clips 11 in the grommet openings 26 of the flag 14, and is as easily detached from the halyard 12 by removing the clips 11 from the grommet openings 26.

My clamping device is sufficiently rugged to withstand the large forces developed when a high wind whips the flag. With the proper choice of materials for the clamp 10, the attachment of the clamp 10 to the halyard 12 and the clip 11 may be as permanent as desired. The rounded corners 22 substantially eliminate any possibility that the blocks 15 will cut or fray the halyard 12 of the flag 14.

My clamping device 9 and clamp 10 are not limited to use with flags. Either may also be used for the attachment of sails or other similar objects to halyards or the like, or for other analogous uses.

It is understood that my invention is not confined to the particular construction and arrangement of parts herein illustrated and described, but embraces all such modified forms thereof as come within the scope of the following claim.

I claim:

In combination, a clamping device for attaching a flag to a halyard comprising:

(a) a pair of mating blocks each having a first and second groove only, (b) fastening means associated with said blocks intermediate said first and second grooves for forcing said blocks together such that said first grooves cooperate to form a first passage extending between said blocks and said second grooves cooperate to define a roughened second passage extending between said blocks for fixedly engaging a halyard, (c) said fastening means being positioned within the outer surfaces of said blocks and said blocks having smooth rounded edges so that said blocks and said fastening means present a substantially smooth exterior, and (d) clip means having an attaching bar and a clip, said attaching bar extending through said block first passage in pivotable relation to secure said clip means to said blocks, and said clip extending outwardly from said blocks at an approximate right angle to said second passage to removably engage and support a flag on said halyard.

References Cited by the Examiner

UNITED STATES PATENTS

| | | | |
|---|---|---|---|
| 710,776 | 10/1902 | Hobart | 24—135 |
| 951,095 | 3/1910 | McCarthy | 24—135 |
| 1,297,039 | 3/1919 | Torkelson | 24—132 |
| 1,338,210 | 4/1920 | Buckley | 116—173 |
| 2,015,403 | 8/1935 | Kiddle | 24—135 |

FOREIGN PATENTS 96,318  7/1960  Norway.

WILLIAM FELDMAN, *Primary Examiner.*

DONLEY J. STOCKING, *Examiner.*

E. SIMONSEN, *Assistant Examiner.*